United States Patent
Hiroya

(10) Patent No.: US 8,744,710 B2
(45) Date of Patent: Jun. 3, 2014

(54) CONTROL DEVICE FOR CONTROLLING DRIVE FORCE THAT OPERATES ON VEHICLE

(75) Inventor: Manabu Hiroya, East Liberty, OH (US)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 613 days.

(21) Appl. No.: 13/075,891

(22) Filed: Mar. 30, 2011

(65) Prior Publication Data

US 2012/0253614 A1   Oct. 4, 2012

(51) Int. Cl.
*G06F 7/00* (2006.01)
*G06F 17/00* (2006.01)
*G06F 19/00* (2011.01)
*B60T 7/12* (2006.01)

(52) U.S. Cl.
USPC .......... 701/69; 701/54; 701/64; 701/82; 701/88; 701/89; 701/90; 701/91

(58) Field of Classification Search
CPC ........... B60K 17/344; B60K 23/0808; B60K 2023/0883; B60K 17/35; B60K 17/348; B60K 17/354; B60Y 2300/80; B60W 2720/403
See application file for complete search history.

(56) References Cited

U.S. PATENT DOCUMENTS

| | | | | |
|---|---|---|---|---|
| 4,766,973 A | * | 8/1988 | Kashihara et al. | 180/249 |
| 4,866,625 A | * | 9/1989 | Kawamoto et al. | 701/89 |
| 5,168,955 A | * | 12/1992 | Naito | 180/197 |
| 5,226,502 A | * | 7/1993 | Kameda | 180/248 |
| 5,631,829 A | * | 5/1997 | Takasaki et al. | 701/69 |
| 5,954,778 A | * | 9/1999 | Rodrigues et al. | 701/69 |
| 6,189,642 B1 | * | 2/2001 | Kusano | 180/247 |
| 6,587,775 B2 | * | 7/2003 | Nishida et al. | 701/89 |
| 6,711,487 B2 | * | 3/2004 | Murakami et al. | 701/69 |
| 6,729,426 B2 | * | 5/2004 | Suzuki | 180/197 |
| 6,886,652 B2 | * | 5/2005 | Maekawa et al. | 180/248 |
| 6,896,083 B2 | * | 5/2005 | Ohtsu | 180/197 |
| 7,152,707 B2 | * | 12/2006 | Matsuda | 180/243 |
| 7,182,168 B2 | * | 2/2007 | Kamata et al. | 180/242 |
| 7,204,332 B2 | * | 4/2007 | Matsuda | 180/197 |
| 7,290,636 B2 | * | 11/2007 | Murakami et al. | 180/433 |
| 7,356,391 B2 | * | 4/2008 | Matsuda et al. | 701/22 |
| 7,434,647 B2 | * | 10/2008 | Sugo et al. | 180/249 |
| 7,634,344 B2 | * | 12/2009 | Masuda et al. | 701/69 |
| 8,157,703 B2 | * | 4/2012 | Saito | 477/83 |
| 2001/0027369 A1 | * | 10/2001 | Nishida et al. | 701/89 |

(Continued)

FOREIGN PATENT DOCUMENTS

JP     07-186758     7/1995

*Primary Examiner* — Khoi Tran
*Assistant Examiner* — Bao Long T Nguyen
(74) *Attorney, Agent, or Firm* — Rankin, Hill & Clark LLP

(57) ABSTRACT

A control device for controlling a front wheel drive force and a rear wheel drive force of a vehicle that includes a transmission comprises: a first controller for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and a second controller for detecting whether a speed-change ratio of the transmission has changed. In a case that the second controller has detected that the speed-change ratio has changed, the first controller increases the drive force of the auxiliary drive wheel and reduces the drive force of the main drive wheel.

13 Claims, 7 Drawing Sheets

(56) References Cited

U.S. PATENT DOCUMENTS

| | | | |
|---|---|---|---|
| 2003/0098193 A1* | 5/2003 | Ohtsu | 180/197 |
| 2003/0109978 A1* | 6/2003 | Murakami et al. | 701/69 |
| 2006/0032692 A1* | 2/2006 | Ima et al. | 180/249 |
| 2006/0212173 A1* | 9/2006 | Post, II | 700/275 |
| 2012/0221221 A1* | 8/2012 | Brenner et al. | 701/88 |

* cited by examiner

CONTROL DEVICE FOR CONTROLLING DRIVE FORCE THAT OPERATES ON VEHICLE

FIELD OF THE INVENTION

The present invention relates to a control device (drive force control device) for controlling front wheel drive force and rear wheel drive force of a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application (JP-A) No. 2006-256605 discloses a four-wheel-drive electronic control unit (4WD-ECU) as such an electronic control device. The 4WD-ECU disclosed in Japanese Laid-open Patent Application No. 2006-256605 together with a vehicle stability assist (VSA)-ECU controls the drive force that operates on the vehicle; and, specifically, sets the four-wheel-drive force in terms of units of, e.g., torque.

Japanese Laid-open Patent Application (JP-A) No. 07-186758 discloses a drive force distribution control device 4 (controller 58) for controlling drive force distribution produced by a drive force transmission system 3 as an electronic control device.

The drive force distribution control device 4 (entire flowchart shown in FIG. 6) disclosed in JP 07-186578 A includes drive force distribution correction means (steps S2, S3, S6, S13, S16 of FIG. 6). The drive force distribution correction means is capable of correcting control signals for adjusting the drive force distribution between main and auxiliary drive wheels for the front and rear wheels in accordance with the detection values of the change-in-rotational-state detection means (deviation of the rotational state detection value of each front and rear wheel corresponding to a main drive wheel and a auxiliary drive wheel). Specifically, when a rapid increasing change has been detected after rapid decrease in the absolute value of the deviation in the detection values of the rotational state of the front and rear wheels, the drive force distribution correction means corrects the change amount of the control signal for adjusting the drive force distribution between main and auxiliary drive wheels for the front and rear wheels in order to reduce the drive force distributed to the main drive wheels. At this time, the state of distribution of the drive force between the front and rear wheels is made the same as the state immediately before the reduction in the absolute value of the deviation in the detection values of the rotational state of the front and rear wheels, and alternatively the ratio of drive force distribution to the auxiliary drive wheels is made to be slightly less than the state immediately before the above-noted reduction, so that the amount of reduction in the drive force to the auxiliary wheels is essentially reduced.

Thus, the inventors recognized that the drive force to the main drive wheels may remain at a high level even if the amount of reduction in the drive force to the auxiliary drive wheels is made less. In other words, the inventors recognized that the main drive wheels may slip in the particular case that the drive force to the main drive wheels was originally high, even if the amount of reduction in the drive force to the auxiliary drive wheels is made less. It is this phenomenon that has not been formally known to those skilled in the art.

SUMMARY OF THE INVENTION

An object of the present invention is to provide a control device that can suppress slipping of a main drive wheels.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to a first aspect of the present invention, there is provided a control device for controlling a front wheel drive force and a rear wheel drive force of a vehicle that includes a transmission, the control device comprising: first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and second control means for detecting whether a speed-change ratio of the transmission has changed, wherein in a case that the second control means has detected that the speed-change ratio has changed, the first control means increases the drive force of the auxiliary drive wheel and reduces the drive force of the main drive wheel.

The inventors recognized that the main drive wheels more readily slip when the speed-change ratio of the transmission changes. The second control means is capable of detecting a change in the speed-change ratio, and the first control means is capable of reducing the drive force of the main drive wheel by increasing the drive force of the auxiliary drive wheel. Reduced main drive wheel drive force makes it possible to reduce slipping of the main drive wheel. Therefore, an improvement is realized in regard to, for example, the stability of the vehicle.

Preferably, the second control means may have: a detection unit for detecting whether the speed-change ratio of the transmission has changed; a first calculation unit for calculating a first drive force that represents an amount of increase in the drive force of the auxiliary drive wheel; a second calculation unit for calculating a second drive force for limiting the first drive force, wherein in the case that the detection unit has detected that the speed-change ratio has changed, the first control means increases the drive force of the auxiliary drive wheel by an amount commensurate to the smallest drive force among the first drive force and the second drive force.

In the case that the first drive force is greater than the second drive force, the smallest drive force is the second drive force, and the first control means increases the auxiliary drive wheel drive force by an amount commensurate with the second drive force (smallest drive force). In the case that the first drive force is equal to the second drive force or less than the second drive force, the smallest drive force is the first drive force, and the first control means increases the auxiliary drive wheel drive force by an amount commensurate with the first drive force (smallest drive force). An unnecessary increase in the auxiliary drive wheel drive force can thus be suppressed because the first drive force is limited by the second drive force.

The first calculation unit may calculate the first drive force on the basis of a slippage amount of a main drive wheel.

The increased amount of the auxiliary drive wheel drive force, i.e., the first drive force, is based on the slippage amount of the main drive force; and is therefore capable of suitably reducing slipping of the main drive wheel.

The second calculation unit may calculate the second drive force on the basis of a motor drive force and a first coefficient, and the first coefficient may depend on a traveling state of the vehicle.

The second drive force for suppressing the first drive force is based on a motor drive force and a traveling state of the vehicle, and can therefore suppress an unnecessary increase in the drive force of the auxiliary drive wheel.

The traveling state may include at least one of a parameter and a steer angle, wherein the parameter may represent an inertial force that acts on the vehicle when the vehicle is making a turn; and the first coefficient may be smaller in proportion to a greater magnitude of at least one of the parameter and the steer angle.

The second drive force may be obtained as the traveling state (first coefficient) of the vehicle on the basis of turning (at least one of a parameter and a steer angle), and, for example, the stability of the vehicle can be improved using such a second drive force.

The second calculation unit may calculate the second drive force on the basis of the motor drive force, the first coefficient, and a second coefficient; and the second coefficient may be smaller in proportion to a higher speed of the vehicle.

The second drive force may be obtained on the basis of the speed (second coefficient) of the vehicle, and, for example, the stability of the vehicle can be improved using such a second drive force.

Preferably, the second control means has a permission unit for permitting the first control means to increase the drive force of the auxiliary drive wheel when a predetermined condition has been satisfied, wherein the predetermined condition may be at least one of a) that a slippage amount of the main drive wheel is equal to or greater than a first predetermined value, b) that a first coefficient which depends on a traveling state of the vehicle is equal to or greater than a second predetermined value, c) that a motor drive force is equal to or greater than a third predetermined value, and d) that a speed of the vehicle is equal to or less than a fourth predetermined value; the traveling state may include at least one of a parameter or a steer angle, and the parameter may represents an inertial force that acts on the vehicle when the vehicle is making a turn; and the first coefficient may be smaller in proportion to a greater magnitude of at least one of the parameter and the steer angle.

The permission unit permits the first control means to increase the drive force of the auxiliary drive wheel when a predetermined condition (at least one among a), b), c), and d) has been satisfied. For example, an unnecessary increase in the drive force of the auxiliary drive wheel can be suppressed because the drive force of the auxiliary drive wheel is actually increased when a predetermined condition has been satisfied. Also, the stability of the vehicle can be improved, for example.

Preferably, the first control means is a drive force control means, and the second control means is a vehicle behavior control means.

According to a second aspect of the present invention, there is provided a vehicle behavior control device for requesting a drive force control unit to increase a drive force of an auxiliary drive wheel of a vehicle that includes a transmission, the vehicle behavior control device comprising: a detection unit for detecting whether a speed-change ratio of the transmission has changed; and a first calculation unit for calculating a first drive force that represents an amount of increase in the drive force of the auxiliary drive wheel, wherein in the case that the detection unit has detected that the speed-change ratio has changed, the vehicle behavior control device requests the drive force control unit to increase the drive force of the auxiliary drive wheel by an amount commensurate to the first drive force.

The vehicle behavior control device requests the drive force control device to increase the drive force of the auxiliary drive wheel when the speed-change ratio of the transmission has changed at a time when the main drive wheel readily slips. In accordance with such a request, the drive force control unit can suppress slipping of the main drive wheel.

Preferably, the vehicle behavior control device further comprises a second calculation unit for calculating a second drive force for limiting the first drive force, wherein in the case that the detection unit has detected that the speed-change ratio has changed, the vehicle behavior control device requests the drive force control unit to increase the drive force of the auxiliary drive wheel by an amount commensurate to the smallest drive force among the first drive force and the second drive force.

An unnecessary increase in the auxiliary drive wheel drive force can be suppressed because the first drive force is limited by the second drive force (second calculation unit).

The drive force control unit may, in the case that the detection unit has detected that the speed-change ratio has changed, reduce the drive force of the main drive wheel by an amount commensurate to the smallest drive force.

The drive force control unit can reduce the drive force of the main drive wheel by an amount commensurate with the smallest drive force and suppress slipping of a main drive wheel in accordance with a request from the vehicle behavior control unit when the speed-change ratio of the transmission has changed.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
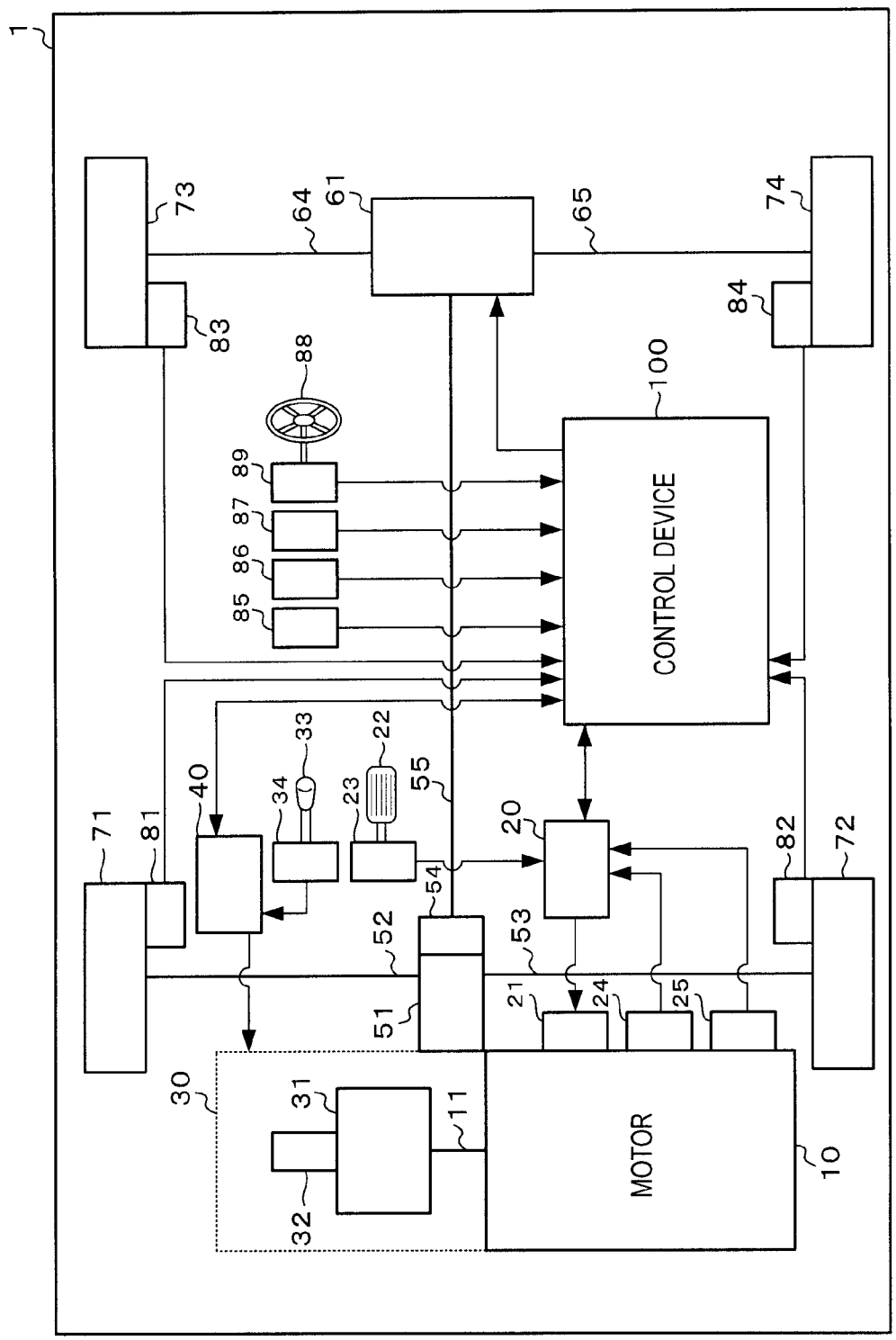
FIG. 1 is a diagrammatical view showing a general configuration of a vehicle provided with a control device according to the present invention.

FIG. 1 shows a schematic structural diagram of a vehicle provided with the control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as examples of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20.

The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission apparatus (power train, drive train). The power transmission apparatus has, e.g., a transmission 30, a front differential gear mechanism 51, front drive shafts 52, 53, a transfer 54, a propeller shaft 55, a rear differential gear mechanism 61, rear drive shafts 64, 65, as shown in FIG. 1. The transmission 30 has a torque converter 31 and gear mechanism 32.

The power transmission apparatus is not limited to the example of FIG. 1, and it is also possible to modify, revise, or implement the example of FIG. 1. The power transmission apparatus may be, e.g., the drive force transmission system 3 disclosed in FIG. 2 of JP 07-186758 A.

The rotation (the actual motor drive force) of the output shaft of the motor 10 is converted to actual all-wheel drive force (the actual front-wheel drive force and the rear-wheel drive force) via the power transmission apparatus. In the control related to such conversion, the all-wheel drive force is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the main drive wheel drive force, to the rear-wheel drive force (target value), which is the auxiliary drive wheel drive force, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the main drive wheel drive force, matches the all-wheel drive force (target value). In the case that the distribution ratio of the rear differential gear mechanism 61 is, e.g., (100-x):x in terms of the front-wheel drive force to rear-wheel drive force, the front-wheel drive force (target value), which is the main drive wheel drive force, matches the value obtained by subtracting the rear-wheel drive force (target value), which is the auxiliary drive wheel drive force, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the front-rear longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control device

Figure 2:
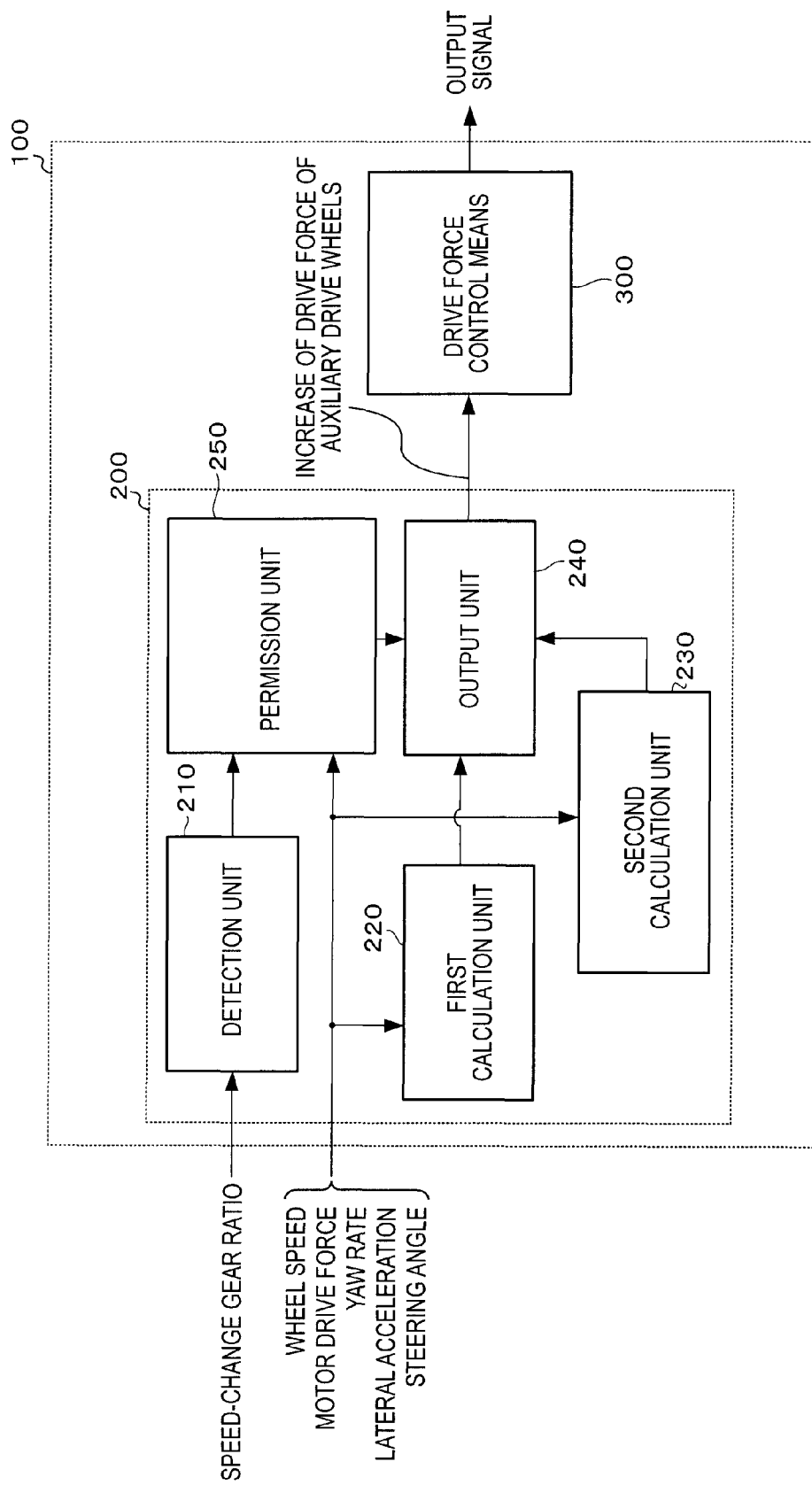
FIG. 2 is a block diagram of the control device according to the present invention.

FIG. 2 shows a schematic structural diagram of the control device according to the present invention. The control device 100 can accept, e.g., the speed-change gear ratio, wheel speed, motor drive force, yaw rate, lateral acceleration, and steer angle as input signals; can generate output signals; and can execute various controls, as shown in FIG. 2. The control device 100 is provided with drive force control means 300, and the drive force control means 300 (also referred to as drive force control means) controls the drive force of the main drive wheels (e.g., the front wheel drive force) and the drive force of the auxiliary drive wheels (e.g., rear wheel drive force), as an example of the various controls.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the example of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the example of FIG. 1.

In the example of FIG. 2, the control device 100 is provided with vehicle behavior control means 200 having a detection unit 210, and the vehicle behavior control means 200 (also referred to as a vehicle behavior control device) or the detection unit 210 detects whether, e.g., the speed-change ratio of the transmission 30 of FIG. 1, specifically, the speed-change gear ratio of the gear mechanism 32 has changed. For example, the input signal from the transmission control means 40 to the detection unit 210 expresses a speed-change gear ratio that corresponds to 1 of any of, e.g., first to fifth speeds. When the input signal changes from, e.g., first speed to second speed, the detection unit 210 can detect that the speed-change ratio of the transmission 30 has changed.

In the case that the vehicle behavior control means 200 or the detection unit 210 has detected that the speed-change ratio has changed, the drive force control means 300 increases the auxiliary drive wheel drive force (target value) and the drive force control means 300 reduces the main drive wheel drive force (target value). Specifically, the drive force control means 300 controls the rear differential gear mechanism 61 so that the auxiliary drive wheel drive force is increased by the distribution ratio of the rear differential gear mechanism 61. When the propeller shaft 55 and the rear drive shafts 64, 65 are more strongly connected, the actual auxiliary drive wheel drive force is increased, and as a result, the actual main drive wheel drive force is reduced. Reduced main drive wheel drive force makes it possible to reduce slipping of the main drive wheels (e.g., front wheels 71, 72). Therefore, the stability of the vehicle 1 is improved, for example.

The drive force control means 300 is capable of determining in advance the main drive wheel drive force (target value) and the auxiliary drive wheel drive force (target value), increasing the auxiliary drive wheel drive force (target value) determined in advance in accordance with the detection results of the vehicle behavior control means 200 or the detection unit 210, and reducing the main drive wheel drive force (target value) determined in advance.

The drive force control means 300 may also be referred to as first control means for determining the main drive wheel drive force (target value) and the auxiliary drive wheel drive force (target value), and the vehicle behavior control means 200 may be referred to as second control means. The drive force control means 300 (first control means) primarily determines the main drive wheel drive force (target value) and the auxiliary drive wheel drive force (target value). The drive force control means 300 (first control means) may determine whether to respond to the request to increase the auxiliary drive wheel drive force (target value) from the vehicle behavior control means 200 (second control means), and may deny the request for an increase. In the case that the vehicle behavior control means 200 (second control means) has detected that the speed-change ratio of the transmission 30 has changed, the drive force control means 300 (first control means) can secondarily (ultimately) determine the main drive wheel drive force (target value) and the auxiliary drive wheel drive force (target value).

3. Vehicle Behavior Control Means (Second Control Means)

FIG. 2 also shows a schematic structural diagram of the vehicle behavior control means 200 according to the present invention. The vehicle behavior control means 200 (second control means) is capable of requesting drive force control means 300 (first control means) to increase the auxiliary drive wheel drive force (target value). In the example of FIG. 2, the vehicle behavior control means 200 is provided with a detection unit 210, a first calculation unit 220, a second calculation unit 230, an output unit 240, and a permission unit 250.

For example, the vehicle behavior control means 200 may be provided with a first calculation unit 220 for calculating a first drive force that expresses the amount of increase in the auxiliary drive wheel drive force (target value), as shown in FIG. 2. In the case that the detection unit 210 has detected that the speed-change ratio of the transmission 30, i.e., the speed-change gear ratio of the gear mechanism 32 has changed, the vehicle behavior control means 200 or the first calculation unit 220 may give a request to the drive force control means 300 so that the drive force of the auxiliary drive wheels increases by an amount commensurate with the first drive force.

3.1. First Drive Force

The first calculation unit 220 is capable of calculating a first drive force (the amount by which the drive force of the auxiliary drive wheels increases) on the basis of the slip amount of the main drive wheels (front wheels 71, 72). The slip amount Smw of the main drive wheels is a value obtained by, e.g., subtracting the speed Vvh_es of the vehicle 1 from the average wheel speed Vmw_av of the main drive wheels. The first calculation unit 220 calculates the average of the two rotational speeds (wheel speeds) detected by, e.g., wheel speed sensors 81, 82, and can obtain the average wheel speed Vmw_av of the main drive wheels. The first calculation unit 220 calculates the average of two rotational speeds (wheel speeds) detected by, e.g., wheel speed sensors 83, 84 and can obtain or estimate the speed Vvh_es of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the first calculation unit 220 is capable of correcting or adjusting the two rotational speeds (wheel speeds) detected by the wheel speed sensors 83, 84, calculating the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The first calculation unit 220 is capable of calculating a first drive force (the amount by which the drive force of the auxiliary drive wheels increases is equal to the amount by which the drive force of the main drive wheels decreases) that is proportional to the slip amount of the main drive wheels (front wheels 71, 72), for example. The first calculation unit 220 can also increase the first drive force and suitably reduce slipping of the main drive wheels in the case that the slip amount increases. The proportion coefficient for calculating the first drive force (amount by which the drive force of the auxiliary drive wheels increases) may be suitably set in accordance with the attributes (e.g., weight, engine displacement) of the vehicle 1.

The first drive force may be based on the slip amount of only one of the two front wheels 71, 72.

3.2. Second Drive Force

For example, the vehicle behavior control means 200 may be provided with a second calculation unit 230 for calculating a second drive force for limiting the first drive force that expresses the amount of increase in the auxiliary drive wheel drive force (target value), as shown in FIG. 2. In the case that the first drive force is calculated to be a high value, the auxiliary drive wheel drive force may rapidly increase. In view of the above, the second drive force can be calculated in order to suppress an unnecessary increase in the drive force of the auxiliary drive wheels.

The vehicle behavior control means 200 of FIG. 2 may be provided with an output unit 240 for outputting the smallest drive force among the first drive force and the second drive force, and the drive force control means 300 can increase the drive force of the auxiliary drive wheels by an amount commensurate to the smallest drive force of the first drive force and the second drive force. In the case that the first drive force is greater than the second drive force, the smallest drive force is the second drive force, and the drive force control means 300 increases the auxiliary drive wheel drive force by an amount commensurate with the second drive force (smallest drive force). In the case that the first drive force is equal to the second drive force or less than the second drive force, the smallest drive force is the first drive force, and the drive force control means 300 increases the auxiliary drive wheel drive force by an amount commensurate with the first drive force (smallest drive force).

The second calculation unit 230 of FIG. 2 is capable of calculating the second drive force on the basis of a motor drive force and a first coefficient. A specific calculational example of the second drive force is described later with reference to FIG. 3, but an outline of the second drive force will be described below. The first coefficient depends on the traveling state of the vehicle 1, and relates to, e.g., the turning of the vehicle 1. For example, in the case that the motor drive force from motor control means 20 of FIG. 1 is high, the second drive force (smallest drive force) for reducing the first drive force may be high. Also, in the case that the degree of turning of the vehicle 1 is high, the second drive force (smallest drive force) may be low with consideration given to the stability of the vehicle 1. Since the second drive force is based on the motor drive force and traveling state of the vehicle 1, it is possible to more suitably control an increase in the drive force of the auxiliary drive wheels (or a reduction in the drive force of the main drive wheels).

The traveling state of the vehicle 1 may include at least one of a parameter (e.g., yaw rate, lateral acceleration) and the steer angle. The yaw rate, lateral acceleration, or other parameter expresses the inertial force that acts on the vehicle 1 when the vehicle 1 turns and is an indicator of the degree to which the vehicle 1 turns. For example, in the case that the yaw rate from the yaw rate sensor 86 of FIG. 1 is high and the degree of turning of the vehicle 1 is therefore high, the second drive force (smallest drive force) may be low with consideration given to the stability of the vehicle 1. In another example, in the case that the lateral acceleration (centrifugal acceleration) from the lateral acceleration sensor 87 of FIG. 1 is high and the degree of turning of the vehicle 1 is therefore high, the second drive force may be low. In a further example, in the case that the steer angle from the steering angle sensor 89 of FIG. 1 is high and the degree of turning of the vehicle 1 is therefore high, the second drive force may be low.

The first coefficient which depends on the traveling state of the vehicle 1 can be set to be smaller in proportion to a greater magnitude of at least one of the parameter and the steer angle, i.e., the degree of turning of the vehicle 1. In the present specification the first coefficient set in this manner may be referred to as the turn coefficient. In the case that the turn coefficient (first coefficient) is high, i.e., if the degree of turning of the vehicle 1 is low, the second drive force (smallest drive force) may be large.

The second calculation unit 230 of FIG. 2 is capable of calculating a second drive force (smallest drive force) that is proportional to, e.g., both the motor drive force and the turn coefficient. In the case that at least one of the motor drive force and the turn coefficient is high, the second drive force is also made to be high, and slipping of the main drive wheels can be more suitably reduced.

The second calculation unit 230 of FIG. 2 is capable of calculating a second drive force (smallest drive force) that is proportional to all of, e.g., the motor drive force, the turn coefficient (first coefficient), and the speed of the vehicle 1 (second coefficient). The second coefficient may be set to be lower in proportion to a higher speed of the vehicle 1. The second drive force (smallest drive force) may be set to be low in correspondence to a low second coefficient, i.e., in proportion to a higher speed of the vehicle 1 with consideration given to the stability of the vehicle 1. The speed of the vehicle 1 is, e.g., the vehicle 1 speed Vvh_es (estimated speed).

Figure 3:
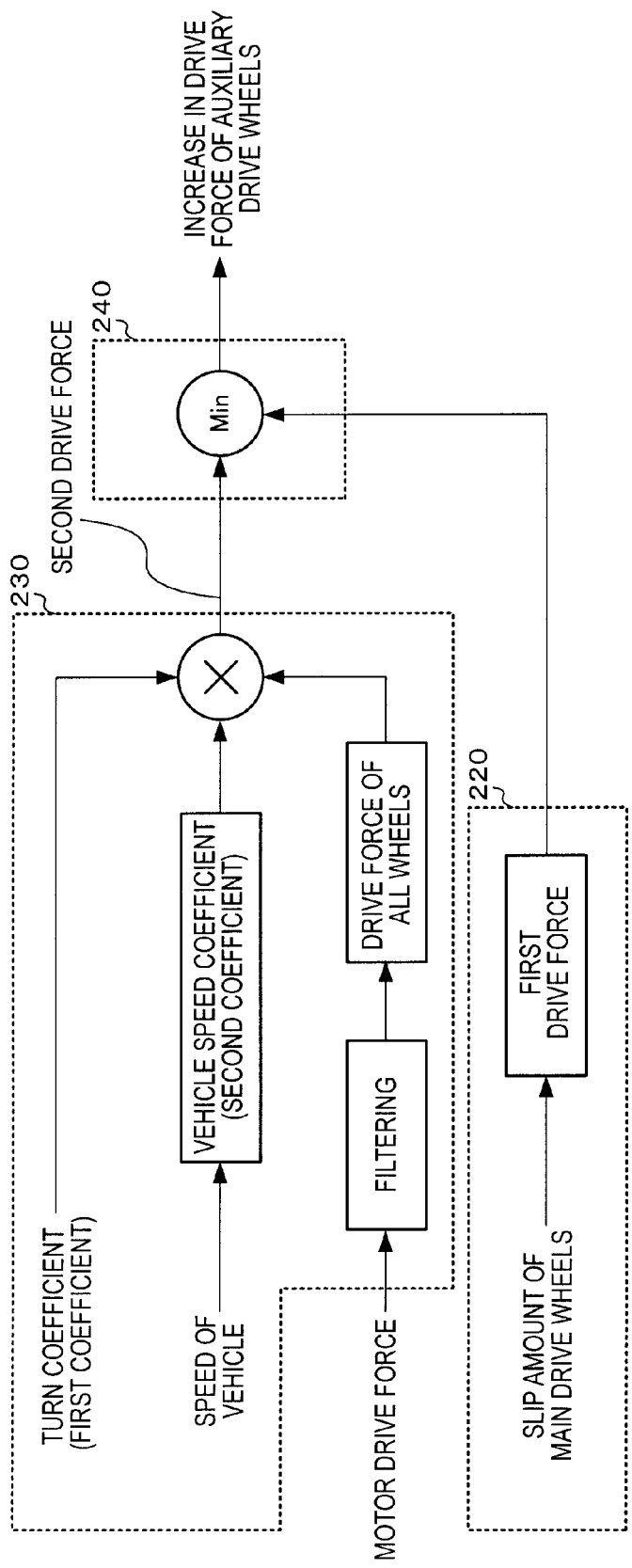
FIG. 3 is a block diagram showing the relationship between a first calculation unit, a second calculation unit, and an output unit of the control device shown in FIG. 2.

FIG. 3 shows the relationship between the first calculation unit 220, the second calculation unit 230, and the output unit 240 of FIG. 2. In the example of FIG. 3, the second drive force is a value obtained multiplying the turn coefficient (first coefficient), the vehicle speed coefficient (second coefficient), and the drive force of all the wheels (motor drive force). The smallest value is obtained from the second drive force and the first drive force, and the output unit 240 of FIG. 2 or 3 can send a request for an increase in the drive force of the auxiliary drive wheels (target value) to the drive force control means 300 of FIG. 2 using the smallest value. FIG. 3 shows a specific example for calculating the second drive force for limiting the first coefficient, and the example of calculating the second drive force is described below.

3.2.1. Motor Drive Force (Drive Force of all Wheels)

In the example of FIG. 3, the second calculation unit 230 is capable of calculating the second drive force which is proportional to the drive force of, e.g., all the wheels in correlation to the motor drive force. The second calculation unit 230 may use as the drive force of all the wheels (target value) the value obtained by multiplying, e.g., the motor drive force (target value) of the motor 10, the speed-change gear ratio (target value) of the gear mechanism 32, and the amplification factor (setting value or target value) of the torque converter 31. It is possible to subject the motor drive force (target value) to, e.g., filtering or other processing. For example, in the case that gear mechanism 32 changes from a speed-change gear ratio expressing the first speed to a speed-change gear ratio that expresses the second speed, the second calculation unit 230 can determine a second drive force on the basis of the speed-change gear ratio that expresses second speed. For example, in the case that the gear mechanism 32 changes from a speed-change gear ratio expressing second speed to a speed-change gear ratio that expresses the third speed, the second calculation unit 230 can determine a second drive force on the basis of the speed-change gear ratio that expresses third speed.

3.2.2. Turn Coefficient (First Coefficient)

In the example of FIG. 3, the second calculation unit 230 can calculate a second drive force that is proportional to the turn coefficient (first coefficient). An example for calculating the turn coefficient is described below.

Figure 4:
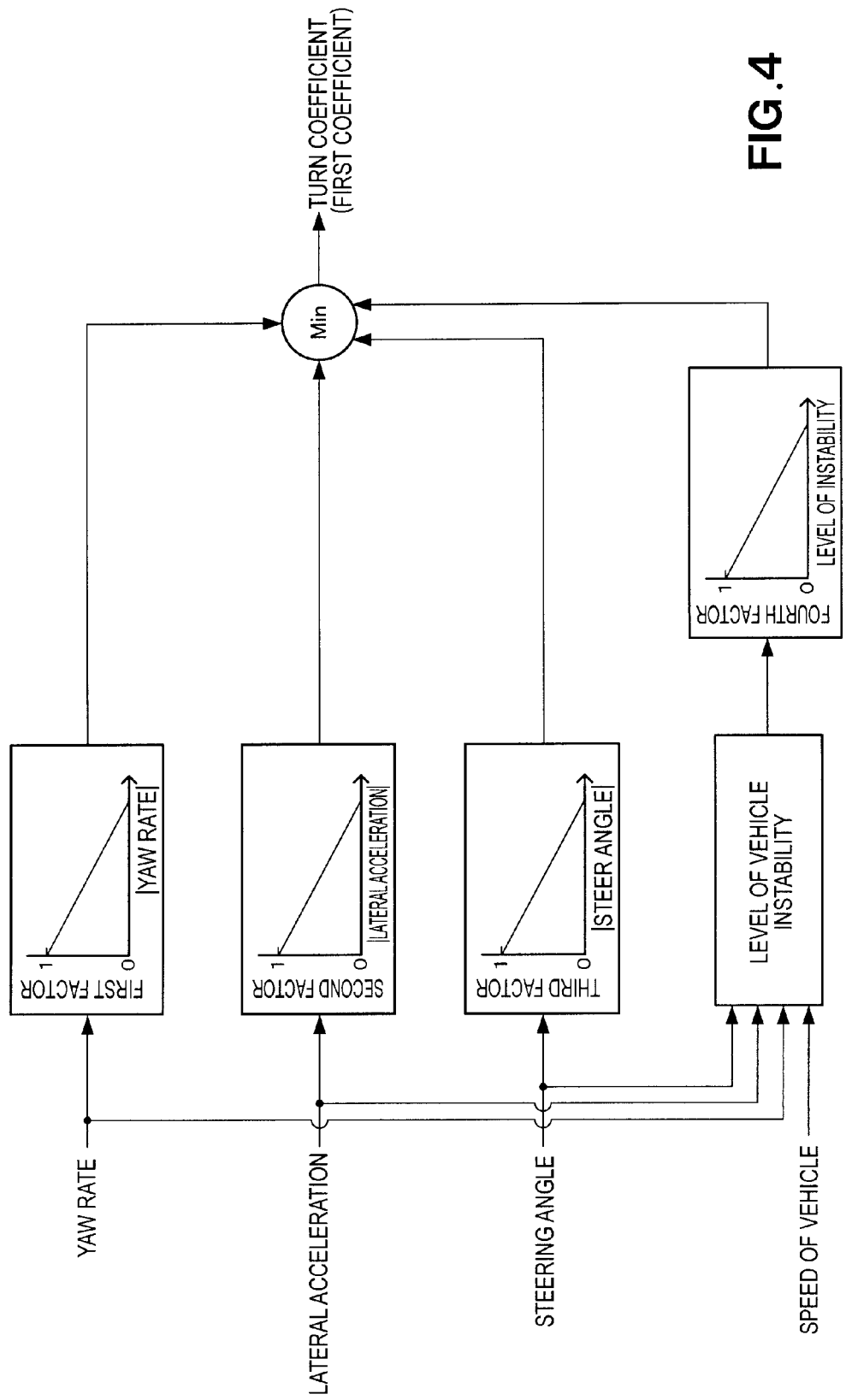
FIG. 4 is a block diagram showing a manner in which a turn coefficient is determined.

FIG. 4 shows a calculation example of the turn coefficient. In the example of FIG. 4, the smallest value is obtained from a first factor (yaw rate), a second factor (lateral acceleration), a third factor (steer angle), and a fourth factor (level of vehicle 1 instability). The second calculation unit 230 of FIG. 2 or 3 can use the smallest value as the turn coefficient. The first factor, second factor, third factor, and fourth factor can each be a coefficient in the range of, e.g., "0" to "1."

The first factor (coefficient) can be set to be lower in proportion to, e.g., a larger absolute value of the yaw rate, and therefore a larger degree of turning of the vehicle 1. The second factor (coefficient) can be set to be lower in proportion to, e.g., a larger absolute value of the lateral acceleration, and therefore a larger degree of turning of the vehicle 1. The third factor (coefficient) can be set to be lower in proportion to, e.g., a larger absolute value of the steer angle, and therefore a larger degree of turning of the vehicle 1. The fourth factor (coefficient) can be set to be lower in proportion to, e.g., a larger level of vehicle 1 instability, and therefore a larger degree of turning of the vehicle 1.

The level of instability in the vehicle 1 can be judged by determining whether the traveling state of the vehicle 1 is unstable using, e.g., the actual yaw rate acquired from the yaw rate sensor 86 and the reference yaw rate calculated based on steer angle and the speed of the vehicle 1. Specifically, the difference (yaw rate deviation) between the actual yaw rate and the reference yaw rate can be used as the level of instability. Also, the level instability may be obtained by subjecting the yaw rate deviation to filter processing. It is also possible to correct or adjust the reference yaw rate using the lateral acceleration acquired from the lateral acceleration sensor 87.

The yaw rate deviation can be used for lateral slippage judgment such as that disclosed in, e.g., Japanese Laid-open Patent Application (JP-A) No. 2009-29220.

3.2.3. Vehicle Speed Coefficient (Second Coefficient)

In the example of FIG. 3, the second calculation unit 230 can calculate a second drive force that is proportional to the vehicle speed coefficient (second coefficient).

Figure 5:
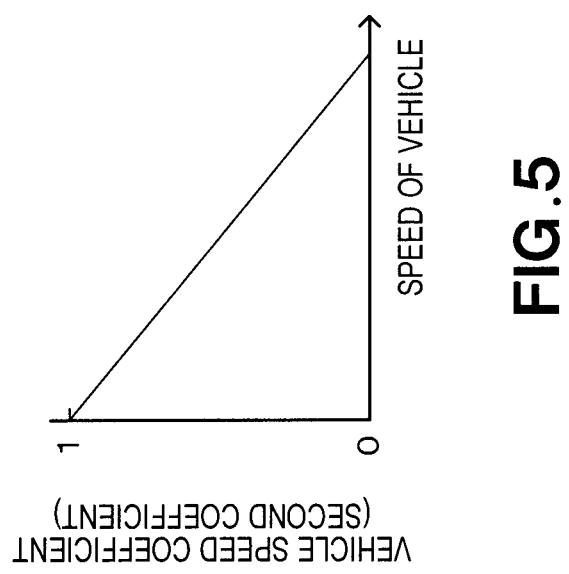
FIG. 5 is a graphical representation of a control map used for determining a vehicle speed coefficient.

FIG. 5 shows a calculation example of the vehicle speed coefficient. The vehicle speed coefficient (second coefficient) may be set to be lower in proportion to a higher speed of the vehicle 1. The speed of the vehicle 1 is, e.g., the vehicle 1 speed Vvh_es (estimated speed). The second calculation unit 230 may calculate the speed of the vehicle 1, or the vehicle 1 speed calculated by the first calculation unit 220 may be used.

3.3. Permission (Suitability) of Request to Increase the Drive Force of the Auxiliary Drive Wheels For example, the vehicle behavior control means 200 may be provided with a permission unit 250 for permitting the drive force control means 300 of FIG. 2 to increase the drive force of the auxiliary drive wheels when a predetermined condition has been satisfied, as shown in FIG. 2. In other words, the permission unit 250 of FIG. 2 permits the output unit 240 to output the smallest drive force of the first drive force and the second drive force when a predetermined condition has been satisfied.

The predetermined condition is at least one of a) that the slippage amount of a main drive wheel is a first predetermined value or higher, b) that the first coefficient which depends on the traveling state of the vehicle 1, e.g., the turn coefficient, is a second predetermined value or higher, c) that the motor drive force is a third predetermined value or higher, and d) that the speed of the vehicle 1 is a fourth predetermined value or lower. For example, an unnecessary increase in the drive force of the auxiliary drive wheels can be suppressed because the request for an increase in the drive force of the auxiliary drive wheels is actually sent when a predetermined condition has been satisfied. Also, the stability of the vehicle 1 can be improved, for example.

Figure 6:
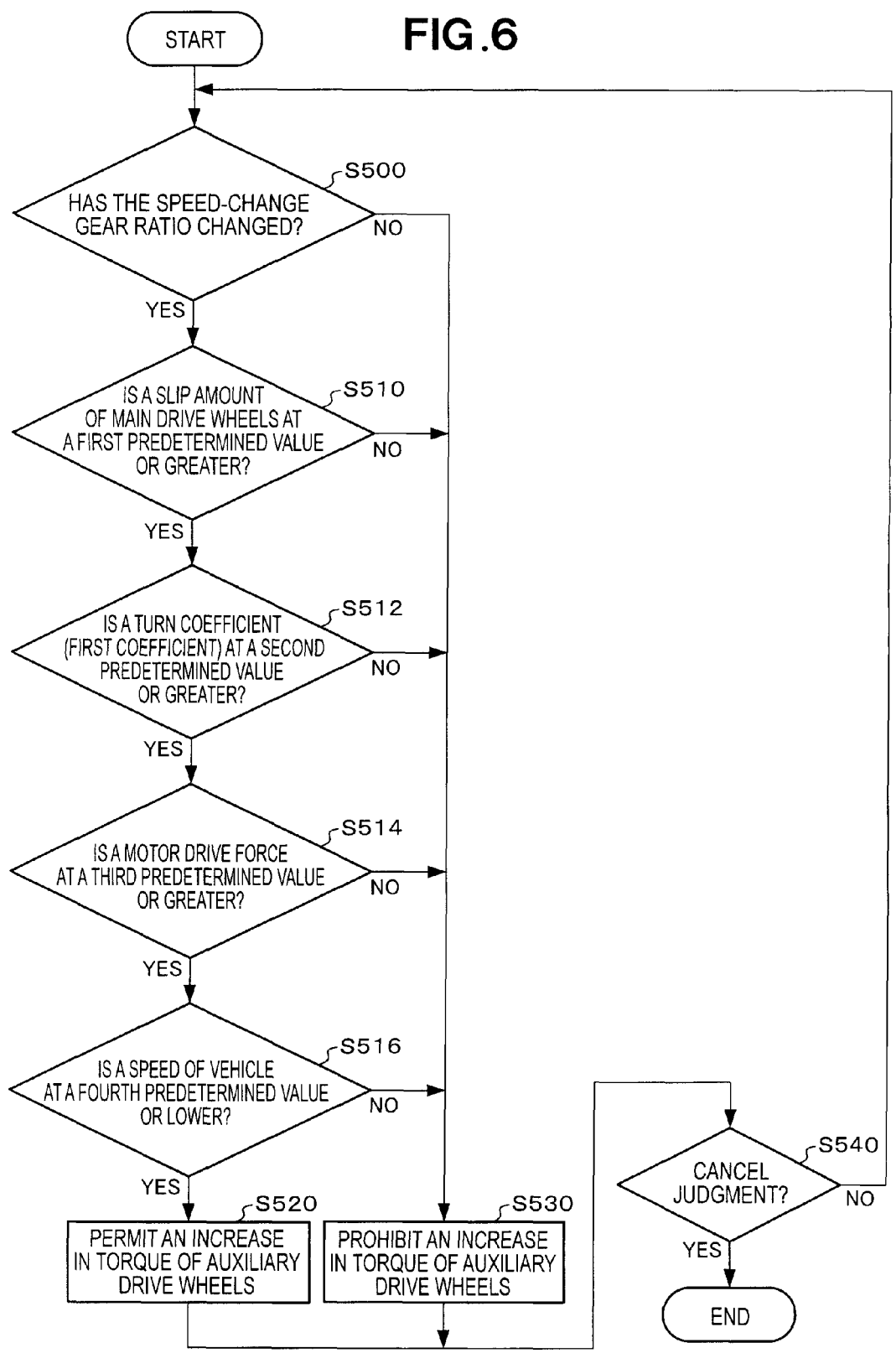
FIG. 6 is a flowchart showing a sequence of operation of a permission unit of the control device shown in FIG. 2; and 7(A), 7(B), 7(C), 7(D), 7(E), and 7(F) are graphs explanatory of the behavior of the vehicle 1.

FIG. 6 shows an operation example of the permission unit. In the example of FIG. 6, the permission unit 250 judges via, e.g., the detection unit 210 whether the speed-change gear ratio of the gear mechanism 32 has changed (step S500 of FIG. 6) when the control device 100 of FIG. 2, or the vehicle behavior control means 200 or permission unit 250 of FIG. 2 has started up. The permission unit 250 may execute the functions of the detection unit 210, and the permission unit 250 itself may detect whether the speed-change gear ratio of the gear mechanism 32 has changed. For example, when the input signal from the transmission control means 40 to the detection unit 210 or the permission unit 250 changes from, e.g., first speed to second speed, the detection unit 210 or the permission unit 250 may detect that the speed-change gear ratio has changed. The permission unit 250 may prohibit (step S530 of FIG. 6) a request to increase the drive force of the auxiliary drive wheels in the case that the speed-change gear ratio of the gear mechanism 32 has not changed.

In the example of FIG. 6, the permission unit 250 judges (step S510 of FIG. 6) whether a) the slip amount of the main drive wheels is at a first predetermined value or higher in the case that the speed-change gear ratio has changed. In the case that the slip amount of the main drive wheels is less than the first predetermined value, it can be presumed that the acceleration of the vehicle 1 has been sufficiently carried out. In the case that the slip amount of the main drive wheels is less than a first predetermined value, the permission unit 250 can prohibit a request to increase the drive force of the auxiliary drive wheels (step S530 of FIG. 6). The first predetermined value can be suitably set in accordance with the attributes of the vehicle 1. The slip amount of the main drive wheels may be the slip amount of only one of the two front wheels 71, 72. The permission unit 250 may calculate the slip amount of the main drive wheels, and may use the slip amount of the main drive wheels calculated by the first calculation unit 220.

The vehicle behavior control means 200 of FIG. 2 may execute the function (traction control system) for suppressing spinning of the front wheels 71, 72 and the rear wheels 73, 74 when the vehicle 1 begins moving or accelerates. The vehicle behavior control means 200 can control spinning via a request or the like to reduce the motor drive force in the case that the vehicle 1 is provided with a traction control system. The vehicle behavior control means 200 may suppress spinning via the brakes (not shown) or other braking unit. The first predetermined value may be the same threshold value at which the function for suppressing such spinning (spinning of at least the front wheels 71, 72) operates. In other words, in step S510 of FIG. 6, the permission unit 250 may judge whether the function for suppressing spinning is operating.

In the example of FIG. 6, the permission unit 250 judges (step S512 of FIG. 6) whether b) the first coefficient which depends on the traveling state of the vehicle 1, e.g., the turn coefficient is at a second predetermined value or higher in the case that the slip amount of the main drive wheels is at a first predetermined value or higher. In the case that the turn coefficient is less than the second predetermined value, it can be presumed that the degree of turning of the vehicle 1 is high. In the case that the turn coefficient is less than the second predetermined value, the permission unit 250 can prohibit a request to increase the drive force of the auxiliary drive wheels (step S530 of FIG. 6). The second predetermined value can be suitably set in accordance with the attributes of the vehicle 1. The permission unit 250 may calculate the turn coefficient, or the turn coefficient calculated by the second calculation unit 230 may be used.

In the example of FIG. 6, the permission unit 250 judges (step S514 of FIG. 6) whether c) the motor drive force is at a third predetermined value or higher in the case that the turn coefficient is at a second predetermined value or higher. In the case that the motor drive force is less than the third predetermined value, it can be presumed that the drive force of all the wheels is low and that slipping of the main drive wheels is unlikely to occur. In the case that the motor drive force is less than the third predetermined value, the permission unit 250 can prohibit a request to increase the drive force of the auxiliary drive wheels (step S530 of FIG. 6). The third predetermined value can be suitably set in accordance with the attributes of the vehicle 1.

In the example of FIG. 6, the permission unit 250 judges (step S516 of FIG. 6) whether d) the speed of the vehicle 1 is at a fourth predetermined value or lower in the case that the motor drive force is at a third predetermined value or higher. In the case that the speed of the vehicle 1 is greater than the fourth predetermined value, it can be presumed that the behavior of the vehicle 1 is disturbed due to an increase in the drive force of the auxiliary drive wheels. In the case that the speed of the vehicle 1 is less than the fourth predetermined value, the permission unit 250 can prohibit a request to increase the drive force of the auxiliary drive wheels (step S530 of FIG. 6). The fourth predetermined value can be suitably set in accordance with the attributes of the vehicle 1. The speed of the vehicle 1 is, e.g., the vehicle 1 speed Vvh_es (estimated speed). The permission unit 250 may calculate the speed of the vehicle 1, or the vehicle 1 speed calculated by the first calculation unit 220 or the second calculation unit 230 may be used.

In the example of FIG. 6, the permission unit 250 may send (step S520 of FIG. 6) to the output unit 240 of FIG. 2 a signal (e.g., a binary signal expressing "1" or a high level) that expresses permission to increase the torque of the auxiliary drive wheels in the case that the speed of the vehicle 1 is at a fourth predetermined value or less. The first calculation unit 220, second calculation unit 230, and output unit 240 may handle the request to increase the drive force of the auxiliary drive wheels (target value) in, e.g., units of torque. In step S530 of FIG. 6, the permission unit 530 may send to the output unit 240 of FIG. 2 a signal (e.g., a binary signal expressing "0" or a low level) that expresses denial of permission to increase the torque of the auxiliary drive wheels.

In step S540 of FIG. 6, the permission unit 250 of FIG. 2 may cancel as necessary judgments related to permission (or suitability) of the request to increase the drive force of the auxiliary drive wheels.

Figure 7:
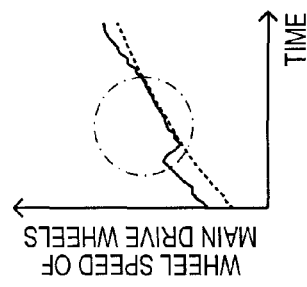
Figure 7:
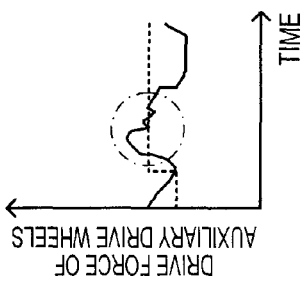
Figure 7:
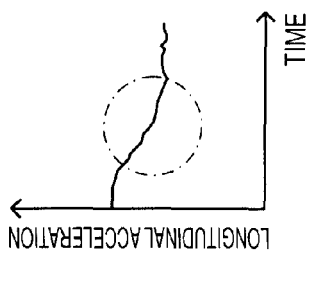
Figure 7:
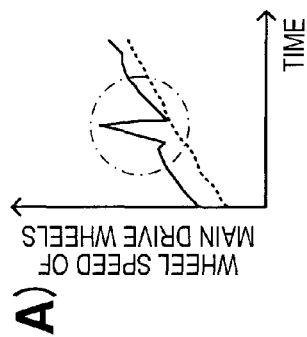
Figure 7:
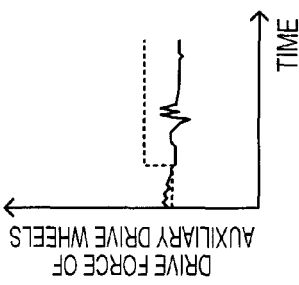
Figure 7:
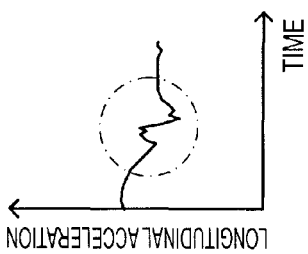

3.4. Permission (Implementation) of Request to Increase the Drive Force of the Auxiliary Drive Wheels FIGS. 7(A), 7(B), and 7(C) show schematic structural diagrams of the behavior of the vehicle 1 when the functions of the vehicle behavior control means 200 of FIG. 2 are invalid. FIGS. 7(D), 7(E), and 7(F) show schematic structural diagrams of the behavior of the vehicle 1 when the functions of the vehicle behavior control means 200 are in effect.

In FIGS. 7(A) and 7(D), the solid line indicates the wheel speed of the main drive wheels, the dotted line indicates the speed of the vehicle 1, e.g., the speed Vvh_es of the vehicle 1 (estimated speed). In the graph of FIG. 7(A), the circle drawn with a broken line shows where the wheel speed of the main drive wheels rapidly has increased and the main drive wheels are slipping.

In FIGS. 7(B) and 7(E), the solid line indicates the drive force of the auxiliary drive wheels, and the dotted line indicates the speed-change gear ratio of the gear mechanism 32. In the graph of FIG. 7(B), the speed-change gear ratio changes from, e.g., first speed to second speed, and the drive force of the auxiliary drive wheels is not increased by the vehicle behavior control means 200 even if the speed-change gear ratio changes.

In FIGS. 7(C) and 7(F), the solid line indicates longitudinal acceleration of the vehicle 1. In the graph of FIG. 7(C), the longitudinal acceleration fluctuates dramatically as indicated by the circle drawn with a broken line.

In the graph of FIG. 7(E), the drive force of the auxiliary drive wheels is increased by the vehicle behavior control means 200 after the speed-change gear ratio has changed from, e.g., first speed to second speed, as indicated by the circle drawn with a broken line. In accordance with a request to increase the drive force of the auxiliary drive wheels by the vehicle behavior control means 200, the drive force control means 300 receives the increase request, increases the actual drive force of the auxiliary drive wheels, and reduces the actual drive force of the main drive wheels. In the graph of FIG. 7(D), slippage of the main drive wheels is therefore reduced as indicated by the circle drawn with a broken line. In the graph of FIG. 7(F), fluctuation of the longitudinal acceleration is low as indicated by the circle drawn with a broken line. Slippage of the main drive wheels can thus be reduced by providing the vehicle 1 with vehicle behavior control means 200.

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a front wheel drive force and a rear wheel drive force of a vehicle that includes a transmission, the control device comprising:
    first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and
    second control means for detecting whether a speed-change ratio of the transmission has changed,
    wherein
    the first control means increases the drive force of the auxiliary drive wheel and reduces the drive force of the main drive wheel when the second control means has detected that the speed-change ratio of the transmission has increased, and the first control means increases the drive force of the auxiliary drive wheel and reduces the drive force of the main drive wheel when the second control means has detected that the speed-change ratio of the transmission has decreased.

2. The control device according to claim 1, wherein
the second control means has a permission unit for permitting the first control means to increase the drive force of the auxiliary drive wheel when a predetermined condition has been satisfied, wherein
the predetermined condition is at least one of a) that a slippage amount of the main drive wheel is equal to or greater than a first predetermined value, b) that a first coefficient which depends on a traveling state of the vehicle is equal to or greater than a second predetermined value, c) that a motor drive force is equal to or greater than a third predetermined value, and d) that a speed of the vehicle is equal to or less than a fourth predetermined value;
the traveling state includes at least one of a parameter or a steer angle, and the parameter represents an inertial force that acts on the vehicle when the vehicle is making a turn; and
the first coefficient is smaller in proportion to a greater magnitude of at least one of the parameter and the steer angle.

3. The control device according to claim 1, wherein
the first control means is a drive force control means, and the second control means is a vehicle behavior control means.

4. A control device for controlling a front wheel drive force and a rear wheel drive force of a vehicle that includes a transmission, the control device comprising:
    first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and
    second control means for detecting whether a speed-change ratio of the transmission has changed,
    wherein
    the second control means has:
        a detection unit for detecting whether the speed-change ratio of the transmission has changed;
        a first calculation unit for calculating a first drive force that represents an amount of increase in the drive force of the auxiliary drive wheel;
        a second calculation unit for calculating a second drive force for limiting the first drive force, and
    wherein
    in a case that the detection unit has detected that the speed-change ratio has changed, the first control means increases the drive force of the auxiliary drive wheel by an amount commensurate to a smallest drive force among the first drive force and the second drive force, and reduces the drive force of the main drive wheel, and
    the second calculation unit calculates the second drive force on the basis of a motor drive force and a first coefficient, and the first coefficient depends on a traveling state of the vehicle.

5. The control device according to claim 4, wherein
the first calculation unit calculates the first drive force on the basis of a slippage amount of the main drive wheel.

6. The control device according to claim 4, wherein
the traveling state includes at least one of a parameter and a steer angle, wherein the parameter represents an inertial force that acts on the vehicle when the vehicle is making a turn; and
the first coefficient is smaller in proportion to a greater magnitude of at least one of the parameter and the steer angle.

7. The control device according to claim 4, wherein
the second calculation unit calculates the second drive force on the basis of the motor drive force, the first coefficient, and a second coefficient; and
the second coefficient is smaller in proportion to a higher speed of the vehicle.

8. The control device according to claim 4, wherein
the first control means increases the drive force of the auxiliary drive wheel and reduces the drive force of the main drive wheel when the second control means has detected that the speed-change ratio of the transmission has increased, and the first control means increases the drive force of the auxiliary drive wheel and reduces the drive force of the main drive wheel when the second control means has detected that the speed-change ratio of the transmission has decreased.

9. A vehicle behavior control device for requesting a drive force control device to increase a drive force of an auxiliary drive wheel of a vehicle that includes a transmission, the vehicle behavior control device comprising:
a detection unit for detecting whether a speed-change ratio of the transmission has changed;
a first calculation unit for calculating a first drive force that represents an amount of increase in the drive force of the auxiliary drive wheel; and
a second calculation unit for calculating a second drive force for limiting the first drive force, wherein
in the case that the detection unit has detected that the speed-change ratio has changed, the vehicle behavior control device requests the drive force control device to increase the drive force of the auxiliary drive wheel by an amount commensurate to a smallest drive force among the first drive force and the second drive force, and
the second calculation unit calculates the second drive force on the basis of a motor drive force and a first coefficient, and the first coefficient depends on a traveling state of the vehicle.

10. The vehicle behavior control device according to claim 9, wherein
in the case that the detection unit has detected that the speed-change ratio has changed, the drive force control device reduces the drive force of a main drive wheel by an amount commensurate to the smallest drive force.

11. The vehicle behavior control device according to claim 9, wherein
the traveling state includes at least one of a parameter and a steer angle, wherein the parameter represents an inertial force that acts on the vehicle when the vehicle is making a turn; and
the first coefficient is smaller in proportion to a greater magnitude of at least one of the parameter and the steer angle.

12. The vehicle behavior control device according to claim 9, wherein
the second calculation unit calculates the second drive force on the basis of the motor drive force, the first coefficient, and a second coefficient; and
the second coefficient is smaller in proportion to a higher speed of the vehicle.

13. The vehicle behavior control device according to claim 9, wherein
the vehicle behavior control device requests the drive force control device to increase the drive force of the auxiliary drive wheel by the amount commensurate to the smallest driving force when the detection unit has detected that the speed-change ratio has increased, and the vehicle behavior control device requests the drive force control device to increase the drive force of the auxiliary drive wheel by the amount commensurate to the smallest driving force when the detection unit has detected that the speed-change ratio has decreased.

* * * * *